United States Patent
Guo

(10) Patent No.: US 10,708,184 B2
(45) Date of Patent: Jul. 7, 2020

(54) SWITCHING PRIMARY/BACKUP PSEUDOWIRE

(71) Applicant: NEW H3C TECHNOLOGIES CO., LTD., Hangzhou (CN)

(72) Inventor: Daorong Guo, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/334,321

(22) PCT Filed: Sep. 19, 2017

(86) PCT No.: PCT/CN2017/102208
§ 371 (c)(1),
(2) Date: Mar. 18, 2019

(87) PCT Pub. No.: WO2018/050120
PCT Pub. Date: Mar. 22, 2018

(65) Prior Publication Data
US 2019/0207848 A1    Jul. 4, 2019

(30) Foreign Application Priority Data

Sep. 19, 2016 (CN) .......................... 2016 1 0831302

(51) Int. Cl.
*H04L 12/703* (2013.01)
*H04L 12/721* (2013.01)
(Continued)

(52) U.S. Cl.
CPC ................ *H04L 45/68* (2013.01); *H04L 1/12* (2013.01); *H04L 41/064* (2013.01);
(Continued)

(58) Field of Classification Search
CPC .......... H04L 45/68; H04L 1/12; H04L 41/064; H04L 41/0659; H04L 45/22; H04L 45/28; H04L 69/40
See application file for complete search history.

(56) References Cited

U.S. PATENT DOCUMENTS 9,036,637 B2    5/2015   Song
2008/0285466 A1   11/2008  Salam et al.
(Continued)

FOREIGN PATENT DOCUMENTS

CN    101572666 A    11/2009
CN    101645810 A    2/2010
(Continued)

OTHER PUBLICATIONS

Katz, D. et al., "Bidirectional Forwarding Detection (BFD)," ISSN 2070-1721, Internet Engineering Task Force (IETF) Website, Available Online at https://tools.ietf.org/html/rfc5880, Jun. 2010, 49 pages.
(Continued)

*Primary Examiner* — Melvin C Marcelo
(74) *Attorney, Agent, or Firm* — McCoy Russell LLP

(57) ABSTRACT

Provided is a method and device for switching a primary/backup PW. When a primary PW is detected having changed into a Down status by a BFD session corresponding to the primary PW, PE searches for a matching switching information entry. When in the switching information entry indicates transmission switching is supported, and Failover value indicates that a packet is forwarded via a backup PW, the PE updates Failover value in a hardware protection switching entry to the Failover value in the switching information entry. When bRX in the switching information entry indicates reception switching is supported, the PE updates drop identifier in a hardware reception entry to a value indicating that a packet is received, and updates the
(Continued)

bFS to a value indicating that transmission switching is not supported; and the PE reports a Down event of the primary PW.

16 Claims, 7 Drawing Sheets

(51) Int. Cl.
*H04L 12/707* (2013.01)
*H04L 1/12* (2006.01)
*H04L 29/14* (2006.01)
*H04L 12/24* (2006.01)

(52) U.S. Cl.
CPC .......... *H04L 41/0659* (2013.01); *H04L 45/22* (2013.01); *H04L 45/28* (2013.01); *H04L 69/40* (2013.01)

(56) References Cited

U.S. PATENT DOCUMENTS

| | | |
|---|---|---|
| 2009/0201831 A1 | 8/2009 | Kumar et al. |
| 2013/0272114 A1 | 10/2013 | Ye |
| 2015/0334006 A1 | 11/2015 | Shao |
| 2017/0353388 A1* | 12/2017 | Pan ...................... H04R 1/1025 |
| 2019/0394123 A1* | 12/2019 | Nagarajan ........... H04L 12/4633 |

FOREIGN PATENT DOCUMENTS

| | | |
|---|---|---|
| CN | 102006227 A | 4/2011 |
| CN | 102611577 A | 7/2012 |
| CN | 102857362 A | 1/2013 |
| EP | 2720419 A1 | 4/2014 |
| JP | 2002353988 A | 12/2002 |
| WO | 2012092779 A1 | 7/2012 |

OTHER PUBLICATIONS

ISA State Intellectual Property Office of the People's Republic of China, International Search Report Issued in Application No. PCT/CN2017/102208, dated Dec. 25, 2017, WIPO, 4 pages.

Nadeau, T. et al., "Bidirectional Forwarding Detection (BFD) for the Pseudowire Virtual Circuit Connectivity Verification (VCCV)," Internet Engineering Task Force (IETF) Website, Available Online at https://tools.ietf.org/html/rfc5885, Jun. 2010, 16 pages.

ISA State Intellectual Property Office of the People's Republic of China, Written Opinion of the International Searching Authority Issued in Application No. PCT/CN2017/102208, dated Dec. 25, 2017, WIPO, 3 pages.

European Patent Office, Extended European Search Report Issued in Application No. 17850321.5, dated Jun. 27, 2019, Germany, 11 pages.

State Intellectual Property Office of the People's Republic of China, Office Action and Search Report Issued in Application No. 201610831302.2, dated Sep. 3, 2019, 7 pages. (Submitted with Partial Translation).

Japanese Patent Office, Office Action Issued in Application No. 2019-515413, dated Mar. 3, 2020, 12 pages. (Submitted with Machine Translation).

* cited by examiner

US 10,708,184 B2

SWITCHING PRIMARY/BACKUP PSEUDOWIRE

CROSS REFERENCE TO RELATED APPLICATION

This present application is a U.S. National Phase of International Patent Application Serial No. PCT/CN2017/102208 entitled "FAILOVER BETWEEN ACTIVE PSEUDO WIRE AND STANDBY PSEUDO WIRE," filed on Sep. 19, 2017. International Patent Application Serial No. PCT/CN2017/102208 claims priority to Chinese Patent Application No. 201610831302.2 filed on Sep. 19, 2016. The entire contents of each of the above-cited applications are hereby incorporated by reference in their entirety for all purposes.

BACKGROUND

A Pseudowire (PW) represents a virtual bidirectional connection between two Service Provider Network Edge (PE) devices. Two Customer Network Edge (CE) devices may communicate with each other by use of PEs. If only one PW is provided between the two CEs, communication cannot be achieved between the two CEs when a PE between the two CEs, a link between a PE and a CE, or a PW between the PEs fails. A PW redundancy protection function deploys a primary PW and a backup PW such that the primary PW, if fails, is switched to the backup PW and the forwarding for a packet may be continued via the backup PW.

In order to fast detect a failure of a public network line which carries a PW between two PEs, a Bidirectional Forwarding Detection (BFD) session may be established on both ends of each PW. A PE device sends BFD control packets asynchronously to a peer device at regular intervals. When several consecutive packets are not received by the peer device, it is considered that the line fails. The PE device (or the peer device) reports a session Down event to a PW application, which may perform a failure process based on the DOWN event.

DETAILED DESCRIPTION OF THE EMBODIMENTS

The present disclosure will now be described in detail with reference to the accompanying drawings and examples so that the objective, technical solution and advantages of the present disclosure are more apparent.

Here, switching of a primary/backup PW is described first. For example, a primary PW and a backup PW may be established between two CEs. Under normal circumstances, the two CEs may communicate via the primary PW. However, when a PE between the two CEs detects that a link of the primary PW is down, the backup PW may be enabled so that a packet may be forwarded between the two CEs via the backup PW.

For example, a PE brings up a backup PW to forward a packet based on an updated hardware protection switching entry and an updated hardware reception entry. The updated hardware protection switching entry instructs the PE to bring up the backup PW to forward a packet. However, it may take a long process from detecting the failure of the primary PW to updating the hardware protection switching entry and the hardware reception entry. Each module in a primary/backup PW switching system needs to perform a series of operations to update the hardware protection switching entry and the hardware reception entry. However, the present disclosure can first update the hardware protection switching entry and the hardware reception entry, and then perform a process (referred to as the primary/backup PW switching process) within an internal structure of the primary/backup PW switching system. The present disclosure may allow switching the primary/backup PW as a priority to minimize a packet loss.

A method provided by the present disclosure will be described below.

Figure 1:
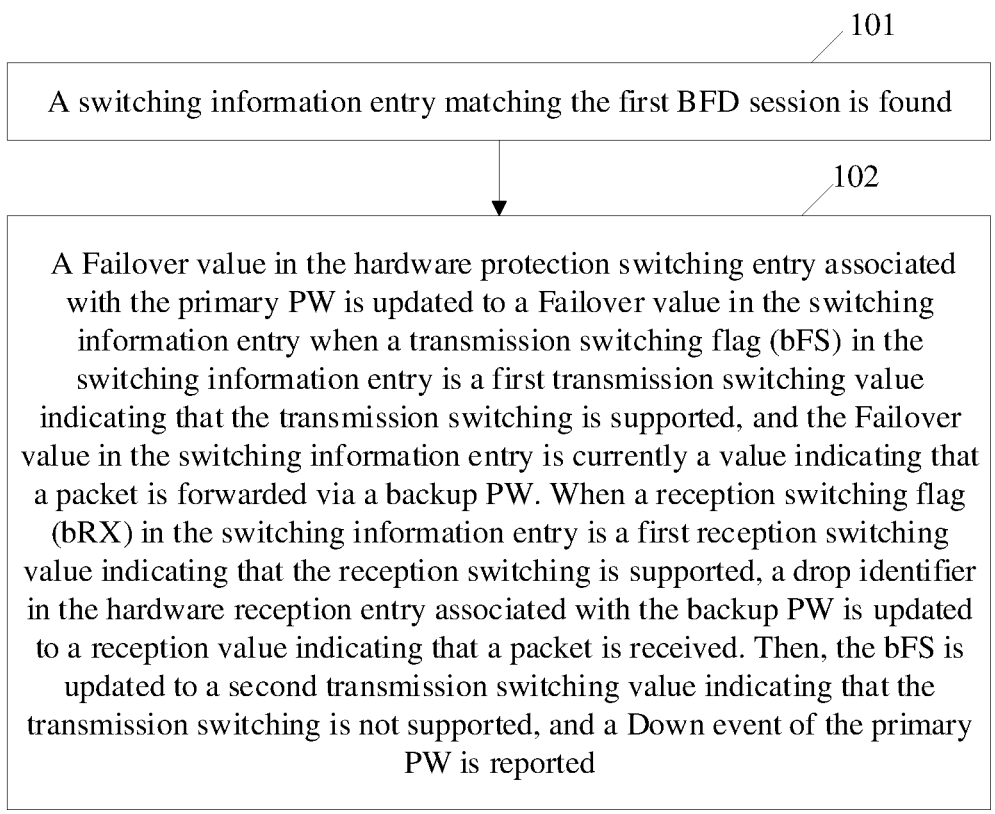
FIG. 1 illustrates a flow chart of a method of switching a primary/backup PW based on an example of the present disclosure.

FIG. 1 illustrates a flow chart of a method based on an example of the present disclosure. This flow is applied to a PE. A primary/backup PW (i.e., a primary PW and a backup PW) is established between the PE and a peer device. Corresponding BFD sessions are run on the primary PW and the backup PW, respectively. For the convenience of description, the BFD session corresponding to the primary PW is referred to as a first BFD session for detecting a link of the primary PW; and the BFD session corresponding to the backup PW is referred to as a second BFD session for detecting a link of the backup PW. It is to be noted that the first BFD session and the second BFD session herein are only used to facilitate distinguishing the BFD session corresponding to the primary PW and the BFD session corresponding to the backup PW, rather than specifically define the BFD session.

When the first BFD session detects that the primary PW is changed into a Down status, as shown in FIG. 1, the flow may include the following blocks.

At block 101, a switching information entry matching the first BFD session is found.

In the present disclosure, only the BFD session corresponding to the primary PW has a matching switching information entry. The switching information entry may provide a basis for updating a hardware protection switching entry and a hardware reception entry when the primary PW is changed into a Down status. The description of a structure of the switching information entry will be emphasized below, which will be not described again herein.

At block 102, a Failover value in the hardware protection switching entry associated with the primary PW is updated to a Failover value in the switching information entry when a transmission switching flag (bFS) in the switching information entry has a first transmission switching value indicating that the transmission switching is supported, and the Failover value in the switching information entry is currently a value indicating that a packet is forwarded via a backup PW. When a reception switching flag (bRX) in the switching information entry has a first reception switching value indicating that the reception switching is supported, a drop identifier in the hardware reception entry associated with the backup PW is updated into a reception value indicating that a packet is received. Then, the bFS is updated into a second transmission switching value indicating that the transmission switching is not supported, and a Down event of the primary PW is reported.

It is to be noted that the first transmission switching value and the second transmission switching value here are only used to facilitate distinguishing whether to support the transmission switching, rather than specifically define a specific value. Similarly, the first reception switching value, and the second reception switching value hereinafter are only used to facilitate distinguishing whether to support the reception switching, rather than specifically define a specific value.

The hardware protection switching entry is used to indicate a path through which a packet is forwarded. At block 102, when the Failover value in the hardware protection switching entry is updated to a value indicating that a packet is forwarded via a backup PW, it means that when the primary PW is changed into the Down status, the primary PW and the backup PW may be switched and then the packet forwarding may be continued via the backup PW.

The hardware reception entry is used to instruct receiving of a packet. At block 102, when the Drop identifier in the hardware reception entry associated with the backup PW is updated into a reception value, it means that even if a PE does not enable a bidirectional receiving function (that is, the PE does not enable that both the primary PW and backup PW can receive a packet), and only the primary PW receives the packet, based on the process in the block 102, a reception function of the backup PW can be enabled when the primary PW is changed into the Down status so that the backup PW starts receiving the packet.

As described at block 102, when the bFS in the switching information entry has the first transmission switching value and the Failover value is currently a value indicating packet forwarding is performed via the backup PW, the Failover value in the hardware protection switching entry associated with the primary PW is updated to the Failover value in the switching information entry so that the primary PW is switched to the backup PW. In other words, the bFS in the switching information entry has the first transmission switching value, which is a premise for switching from the primary PW to the backup PW. However, when the primary PW cannot be switched to the backup PW, it is needed to update the bFS in the switching information entry into the second transmission switching value timely to avoid erroneous switching from the primary PW to the backup PW. Based on this, updating the bFS in the switching information entry into the second transmission switching value at block 102, which is described last, is intended to avoid erroneous switching from the primary PW to the backup PW.

As described at block 102, it may be seen that the Down event of the primary PW is reported after the hardware protection switching entry and the hardware reception entry are updated. It means that the updating of the hardware protection switching entry and the updating of the hardware reception entry at the block 102 do not depend on the existing switching flow of the primary/backup PW, but on the bFS in the switching information entry. This makes it easier to achieve the purpose of first switching between the primary PW and the backup PW and then performing the primary/backup PW switching flow when the primary PW is changed into the DOWN status.

In other words, in the present disclosure, the hardware protection switching entry and the hardware reception entry are updated in advance to the primary/backup PW switching flow. Based on the existing the primary/backup PW switching flow, when the primary PW is changed into the Down status, it is needed to report the Down event of the primary PW, then process the Down event of the primary PW, and finally update the hardware protection switching entry and the hardware reception entry. Based on the present disclosure, when the primary PW is changed into the Down status, the hardware protection switching entry and the hardware reception entry may be updated in advance.

As an example, the Down event of the primary PW is reported in the above block 102, specifically including: finding a first basic information entry matching the first BFD session; reporting the Down event of the primary PW after a set delay time T has elapsed when a Delay parameter of the first basic information entry is a first Delay value, where the first Delay value is a value indicating that the Down event is supported to be reported with delay; and reporting the Down event of the primary PW when the Delay parameter of the first basic information entry is a second Delay value, where the second Delay value is a value indicating that the Down event is not supported to be reported with delay. It is to be noted that the first Delay value and the second Delay value herein are only used to facilitate distinguishing whether to report the Down event with delay, rather than specifically define a specific value.

In the present disclosure, each of a primary PW and a backup PW has a corresponding BFD session and a matching basic information entry. Herein the basic information entry matching the BFD session is established at the beginning of creating the BFD session and contains data information related to the BFD session. The structure of the basic information entry will be described below and therefore is not described herein.

Thus, the flow shown in FIG. 1 is completed.

Several entries mentioned in the present disclosure are described below.

A hardware protection switching table: the table contains a hardware protection switching entry. The hardware protection switching entry mainly includes a hardware protection switching entry index (EgrID) and a Failover value, where the Failover value is used to indicate a path through which a packet is forwarded. When the Failover value is a value indicating that a packet is forwarded via the primary PW, the packet is forwarded via the primary PW. When the packet is forwarded via the primary PW, an egress label of the primary PW is encapsulated for the packet, then public network tunnel header information of the primary PW is encapsulated. When the Failover value is a value indicating that a packet is forwarded via the backup PW, the packet is forwarded via the backup PW. When the packet is forwarded via the backup PW, an egress label of the backup PW is encapsulated for the packet, and public network tunnel header information of the backup PW is encapsulated together. For example, when the Failover value is 0, it indicates that the packet is forwarded via the primary PW. When the Failover value is 1, it indicates that the packet is forwarded via the backup PW.

A hardware reception table: the table contains a hardware reception entry. The primary PW and the backup PW correspond to different hardware reception entries, respectively. The hardware reception entry mainly includes a hardware reception entry index (IngID), an Ingress label value, and a drop identifier. When the drop identifier is a drop value such as 1, it indicates that the received packet is dropped. When the drop identifier is a reception value such as 0, it indicates that the packet is received.

The hardware protection switching table and the hardware reception table in the present disclosure are similar to those in an existing primary/backup PW redundancy scheme, which will not be described in detail herein.

A basic information table: the table includes a basic information entry. A BFD session has a matching basic information entry.

The basic information entry matching the BFD session mainly includes:

1) Sid: a BFD session identifier. A BFD session has a unique identifier. As described above, each of the BFD session corresponding to the primary PW and the BFD session corresponding to the backup PW may have a matching basic information entry respectively. Based on this, the Sid here may be the identifier of the BFD session corresponding to the primary PW or the identifier of the BFD session corresponding to the backup PW;

2) Valid: an entry validity identifier. When Valid is a valid value, it indicates that the basic information entry is valid. On the contrary, when Valid is an invalid value, it indicates that the basic information entry is invalid. For example, when Valid is 1, it indicates that the basic information entry is valid, and when Valid is 0, it indicates that the basic information entry is invalid;

3) P-Sid: a peer session identifier. The BFD sessions corresponding to the primary PW or the backup PW mutually form a peer session relationship. That is, the peer session of the BFD session corresponding to the primary PW is the BFD session corresponding to the backup PW, and the peer session of the BFD session corresponding to the backup PW is the BFD session corresponding to the primary PW;

4) M/B: an attribute identifier of a primary/backup PW. When Sid is the BFD session identifier corresponding to the primary PW, the attribute identifier is a value indicating the primary PW, such as M, which is used to indicate that it is corresponding to the primary PW. When Sid is the BFD session identifier corresponding to the backup PW, the attribute identifier is a value indicating the backup PW, such as B;

5) In Label: PW ingress label;

6) Out Label: PW egress label;

7) Status: a session status of BFD, which may contain statuses such as UP, Down, and Init;

8) A Delay parameter: the parameter indicates whether to support the Down event to be reported with delay. Basically, both the primary PW and the backup PW support the Down event to be reported with delay, but some special PWs cannot support the reporting being delayed (for example, in the case of the absence of a primary PW or a backup PW, it is needed to report in time). In this case, when the Delay parameter is a first Delay value, such as 1, it indicates that delayed reporting is supported. When the Delay parameter is a second Delay value, such as 0, it indicates that the delayed reporting is not supported.

Table 1 shows the basic information table by way of example.

TABLE 1

| Sid | Valid | P-Sid | M/B | In Label | Out Label | Status | Delay |
|---|---|---|---|---|---|---|---|
| 0 | 1 | 126 | B | 66535 | 10 | Up | 1 |
| 1 | 1 | 125 | M | 66536 | 13 | Down | 1 |

TABLE 1-continued

| Sid | Valid | P-Sid | M/B | In Label | Out Label | Status | Delay |
|---|---|---|---|---|---|---|---|
| 2 | 1 | 127 | M | 66538 | 17 | Init | 0 |
| ... | ... | ... | ... | ... | ... | ... | ... |
| 125 | 1 | 1 | B | 66000 | 219 | Up | 1 |
| 126 | 1 | 0 | M | 66003 | 218 | Up | 1 |
| 127 | 0 | 2 | B | 66050 | 100 | Up | 0 |

Based on the structure of the basic information entry described above, the first basic information entry matching a first BFD session is found, specifically including: searching a local basic information table for a matching basic information entry by using the identifier of the first BFD session as a keyword, and using the found basic information entry as the basic information entry matching the first BFD session.

A switching information table: the table contains a switching information entry. In the present disclosure, only the BFD session of the primary PW has a matching switching information entry. The switching information entry mainly includes:

1) Sid: a BFD session identifier;

2) bFS: a transmission switching flag. When the bFS has a first transmission switching value indicating that the transmission switching is supported, such as 1, it indicates that the transmission switching is supported. When the bFS has a second transmission switching value indicating that the transmission switching is not supported, such as 0, it indicates that the transmission switching is not supported;

3) bRX: a reception switching flag. When the bRX has a first reception switching value indicating that the reception switching is supported, such as 1, it indicates that the reception switching is supported. When the bRX has a second reception switching value indicating that the reception switching is not supported, such as 0, it indicates that the reception switching is not supported;

4) EgrID: an index of a hardware protection switching entry associated with the primary PW for facilitating finding the hardware protection switching entry;

5) A Failover value: a failover value, which may be an initial value initially, and will be updated subsequently. In the present disclosure, no matter how the failover value is updated, when the primary PW is operating normally, the Failover value in the switching information entry matching the BFD session of the primary PW is different from the Failover value in the hardware protection switching entry associated with the primary PW. That is, the Failover value in the switching information entry matching the BFD session of the primary PW is a value indicating that a packet is forwarded via the backup PW, while the Failover value in the hardware protection switching entry is a value indicating that the packet is forwarded via the primary PW. Because the Failover value in the switching information entry is different from the Failover value in the hardware protection switching entry, when the primary PW fails, it is needed to update the Failover value in the hardware protection switching entry to the Failover value in the switching information entry, so that the primary PW is directly switched to the backup PW to forward subsequent packets;

6) IngID: an index of the hardware reception entry associated with the backup PW corresponding to the primary PW, for facilitating finding the hardware reception entry;

7) BInLabel: an ingress label of the backup PW.

Table 2 shows a switching information table by way of example. In Table 2, "-" indicates no attention.

TABLE 2

| Sid | bFS | Rx | EgrID | Failover | IngID | BInLabel |
|---|---|---|---|---|---|---|
| 0 | — | — | — | — | — | — |
| 1 | 1 | 1 | 0x186ff | 1 | 0x1800 0058 | 131198 |
| 2 | 1 | 1 | 0x18701 | 0 | 0x1800 005a | 131196 |
| ... | ... | ... | ... | ... | ... | ... |
| 125 | — | — | — | — | — | — |
| 126 | 1 | 0 | 0x1870e | 1 | — | — |
| 127 | — | — | — | — | — | — |

Based on the structure of the switching information entry described herein, the switching information entry matching the first BFD session is found at block 101, specifically including: searching a local switching information table for a matching switching information entry by using the identifier of the first BFD session as a keyword, and using the found switching information entry as the switching information entry matching the first BFD session.

Based on the entries described above, the flow shown in FIG. 1 is described below by way of one example.

Figure 2:
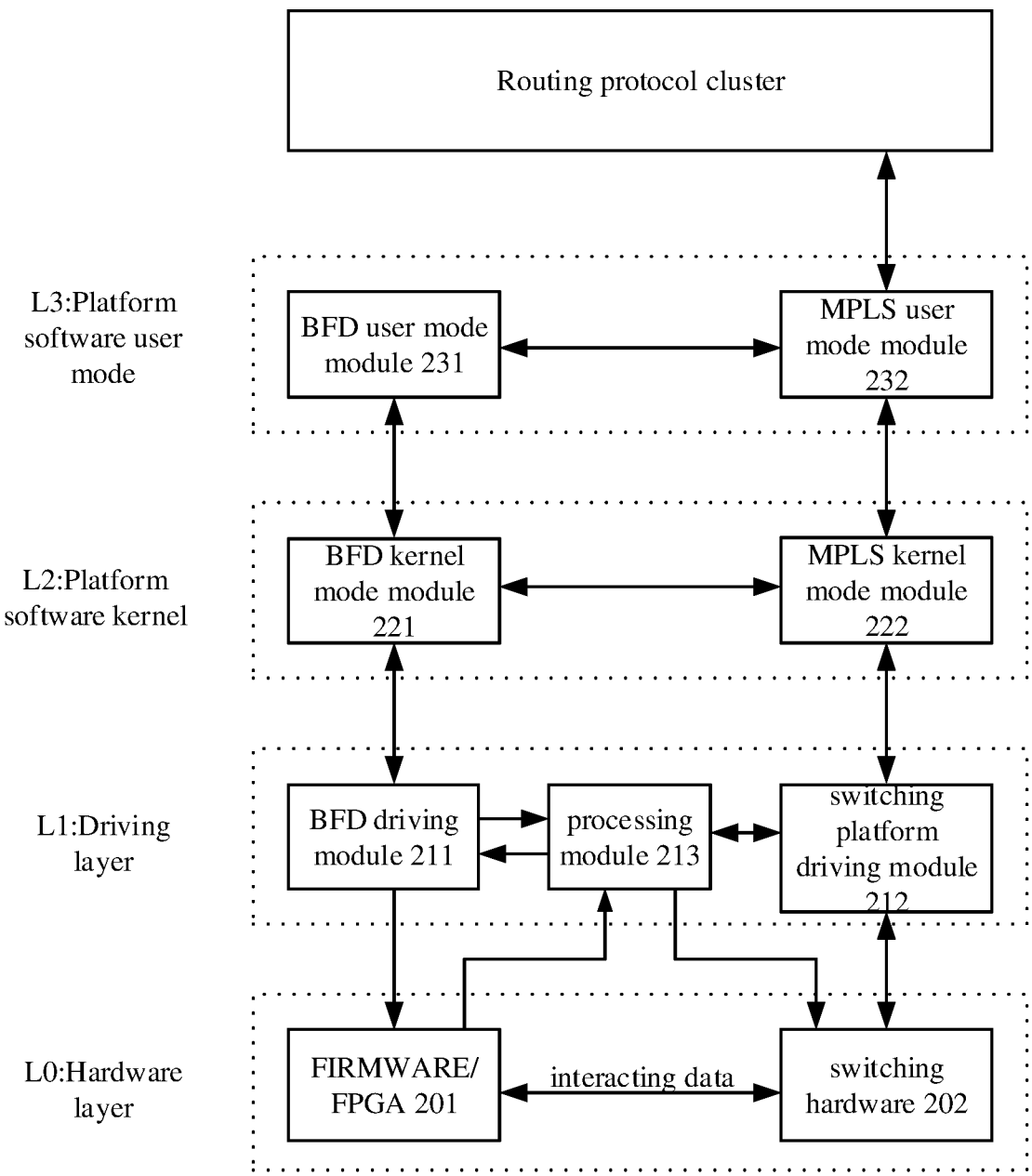
FIG. 2 illustrates a block diagram of an internal system for a PE to switch a primary/backup PW based on a BFD based on an example of the present disclosure.

In an example of the present disclosure, a hardware protection switching entry and a hardware reception entry may be updated first, then the switching flow of the primary/backup PW may be performed. As shown in FIG. 2, the present disclosure provides an internal structure for switching a primary/backup PW. The internal structure for switching the primary/backup PW includes L0: a hardware layer, L1: a driving layer, L2: a platform software kernel, L3: a platform software user mode and a routing protocol family which are ordered from bottom to top. The hardware layer includes a FIRMWARE/FPGA 201 and a switching hardware 202 for interacting data. The driving layer includes a BFD driving module 211 and a switching platform driving module 212. The platform software kernel includes a BFD kernel mode module 221 and an MPLS kernel mode module 222 for interacting data. The platform software user mode includes a BFD user mode module 231 and an MPLS user mode module 232 for interacting data. Herein, the hardware layer reports a DOWN event of a primary PW to the BFD driving module 201. The BFD driving module 201 reports the DOWN event of the primary PW to the BFD kernel mode module 221. The BFD kernel mode module 221 adapts different protocols and informs the MPLS kernel mode module 222 to perform the corresponding processing (for example, updating public network tunnel information of a PW, informing the switching platform driving module 212 to update an underlying PW, etc.). The switching platform driving module 212 performs the following processing: updating switching platform egress interface information and updating a switching platform PW data structure. Finally, the switching platform driving module 212 updates and issues the hardware protection switching entry and the hardware reception entry to the switching hardware. In the present disclosure, a processing module 213 is newly added to the driving layer. The newly added processing module 213 is connected between the BFD driving module 211 and the switching platform driving module 212. It is to be noted that even if the processing module 213 is newly added to the driving layer in the present disclosure, the present disclosure does not change the original primary/backup PW switching flow and at the same time ensures that the execution of the original modules of the respective layers is not affected.

Figure 3:
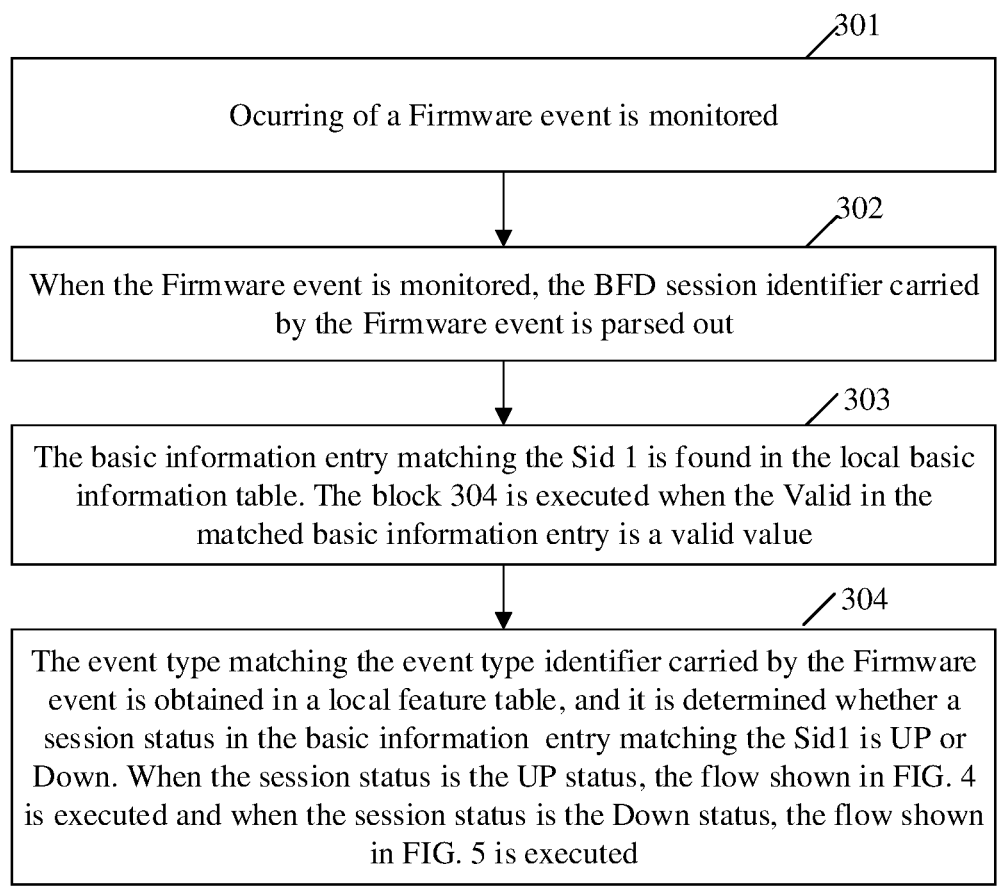
FIG. 3 illustrates a flow chart of switching of a primary/backup PW based on an example of the present disclosure.

FIG. 3 illustrates a flow diagram of an example based on the present disclosure. The flow is executed by the processing module 213 shown in FIG. 2. As shown in FIG. 3, the flow may include the following blocks.

At block 301, occurring of a Firmware event is monitored.

At block 302, when the Firmware event is monitored, the BFD session identifier carried by the Firmware event is parsed out.

In the present example, the Firmware event is taken as an example. The Firmware event may be triggered by changing a BFD session into an UP status, or may be triggered by changing a BFD session into a DOWN status, and so on, which will be described in detail hereinafter. In the present disclosure, a Firmware event carries at least a BFD session identifier and an event type identifier. For example, if the Firmware event is triggered by changing the BFD session into the UP status, the BFD session identifier carried by the Firmware event is the identifier of the BFD session in the UP status, and the event type identifier is the identifier of the UP event.

For the convenience of description, the BFD session identifier carried by the Firmware event is denoted as Sid1 in the present example. Herein Sid1 may be the identifier of the BFD session corresponding to the primary PW or the identifier of the BFD session corresponding to the backup PW, which will be analysed one by one hereinafter.

At block 303, the basic information entry matching the Sid1 is found in the local basic information table. The block 304 is executed when the Valid in the matched basic information entry is a valid value.

At block 303, the basic information entry matching the Sid1 is found in the local basic information table, specifically including: searching the local basic information table for a matching basic information entry by using the Sid1 as a keyword, and using the found basic information entry as the basic information entry matching Sid1.

As an example, when the Valid of the matched basic information entry is an invalid value, the Firmware event is directly reported to the BFD driving module 211, and the BFD driving module 211 will then operate based on the existing primary/backup PW switching flow, which will not be described herein.

Figure 4:
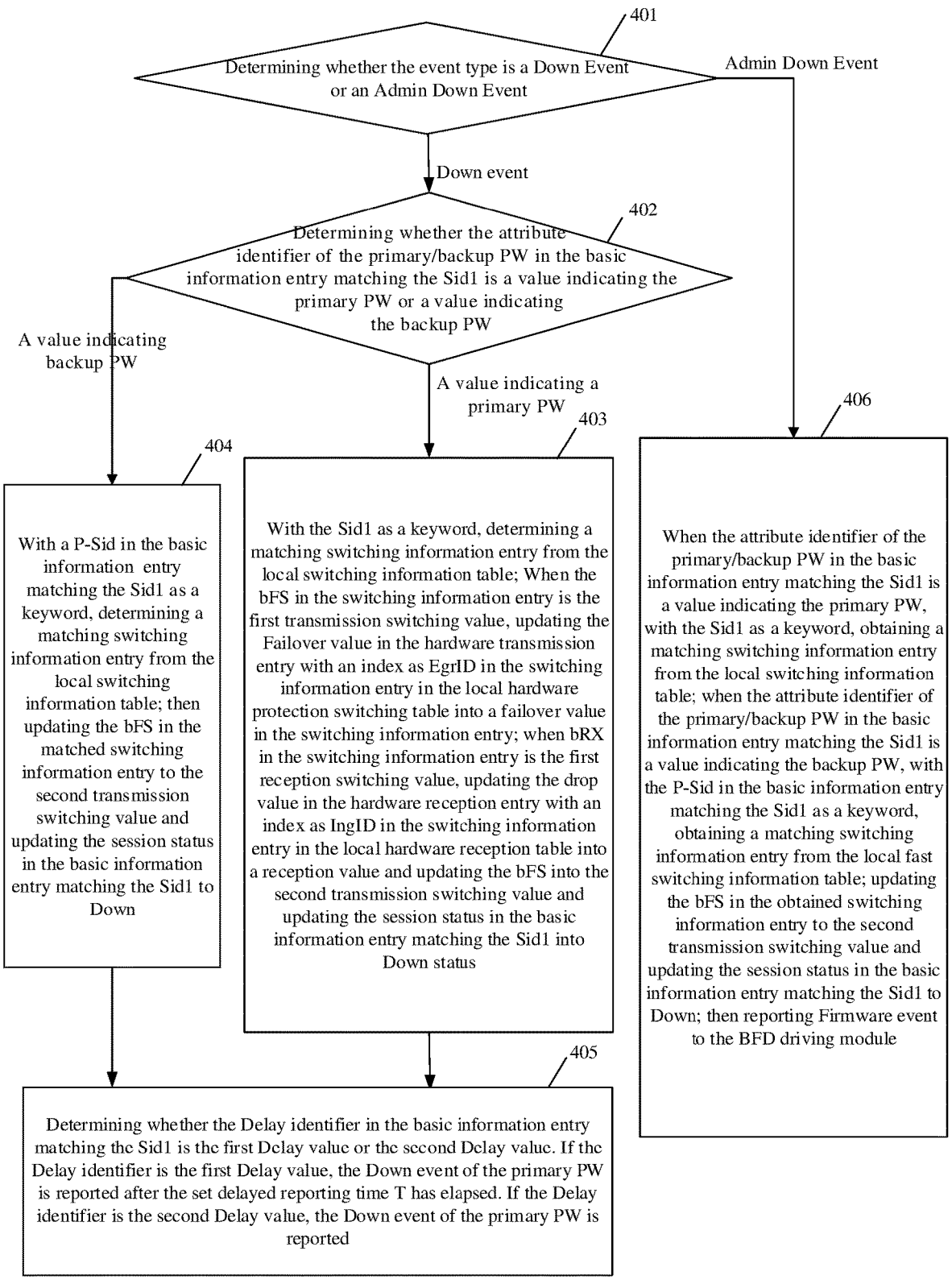
FIG. 4 illustrates a flow chart of switching of a primary/backup PW based on an example of the present disclosure.
Figure 5:
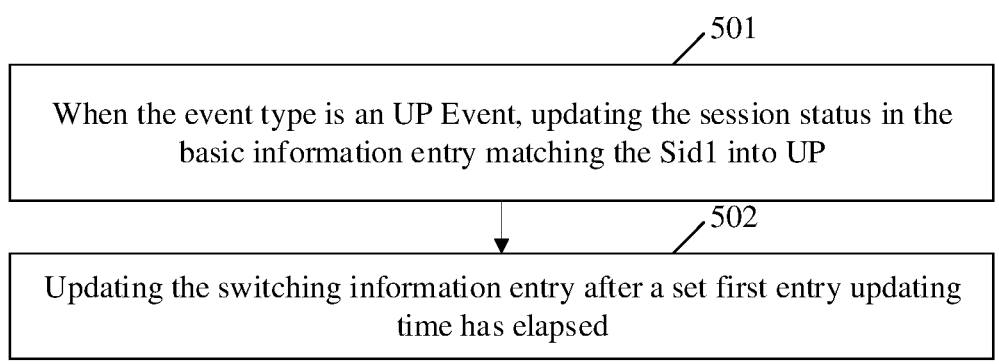
FIG. 5 illustrates a flow chart of switching of a primary/backup PW based on an example of the present disclosure.

At block 304, the event type is found in a local feature table by matching the event type identifier, which is carried by the Firmware event, and it is determined whether a session status in the basic information entry matching Sid1 is UP or Down. When the session status is the UP status, the flow shown in FIG. 4 is executed and when the session status is the Down status, the flow shown in FIG. 5 is executed.

Although the session status in the basic information entry described above further includes Init, etc., only the session statuses which are UP and Down are described in detail, and other situations are not described in detail in the present disclosure.

In the present disclosure, a feature table for storing user customization information includes the following feature entries:

UPDelayTimer: a first entry timer value may be set as 1000 ms. Since the value is only an example herein, it may also be set as other values, which will be used hereinafter and will not be described in detail;

PWUpdateTimer: a second entry timer value may be set as 10000 ms. Since the value is only an example herein, it may also be set as other values, which will be used hereinafter and will not be described in detail;

BFDDownTimer: a delayed reporting timer value, that is, the above T. For example, T may be set as 15 ms;

MaxSessions: the maximum number of sessions supported by a PE device. For example, the PE may support 512 BFD sessions;

Admin Down Event: an Admin Down event. When a user initiatively deletes a BFD session, it indicates an Admin Down event;

Down Event: a BFD session goes down event;

UP Event: an event in which a BFD session is changed into an UP status;

PW Type: a type of a medium carrying a PW. The present disclosure supports Vlan and Ethernet by default.

Table 3 shows a feature table by way of example.

TABLE 3

| Name | Value | Notes |
|---|---|---|
| UPDelayTimer | 1000 (ms) | Type = 1 |
| PWUpdateTimer | 10000 (ms) | Type = 2 |
| BFDDownTimer | 15 (ms) | Type = 3 |
| MaxSessions | 512 | |
| Admin Down Event | 0 | |
| Down Event | 2 | |
| UP Event | 3 | |
| PWType | 4-Vlan, 5-Ethernet | |

Based on the feature table described above, the block 304 specifically includes: finding the event type corresponding to the event type identifier carried by the Firmware event in the local feature table. With table 3 as an example, if the event type identifier is 0, the matched event type is Admin Down Event; if the event type identifier is 2, the matched event type is Down Event; and if the event type identifier is 3, the matched event type is UP Event.

Thus, the flow shown in FIG. 3 is completed.

FIG. 4 illustrates a flow chart of an example based on the present disclosure. As shown in FIG. 4, the flow may include the following blocks.

At block 401, it is determined whether the event type is a Down Event or an Admin Down Event. When the event type is a Down Event, the block 402 is executed, and when the event type is an Admin Down Event, the block 406 is executed.

Herein, the block 401 is executed when it is determined at block 304 that the session status in the basic information entry matching Sid1 is UP.

It is to be noted that in the present example, if the above event type is an event type other than the Down Event and the Admin Down Event, such as an UP Event, the event type is directly reported to the BFD driving module 211 to be processed based on the existing reporting flow, which will not be described.

At block 402, it is determined whether the attribute identifier of the primary/backup PW in the basic information entry matching the Sid1 is a value indicating the primary PW or a value indicating the backup PW. When the identifier is the value indicating the primary PW, the block 403 is executed, and when the identifier is the value indicating the backup PW, the block 404 is executed.

At block 402, when the attribute identifier of the primary/backup PW is a value indicating the primary PW, it is determined that the primary PW is changed into the Down status.

At block 402, when the attribute identifier of the primary/backup PW is a value indicating the backup PW, it is determined that the backup PW is changed into the Down status.

At block 403, a matching switching information entry may be determined from the local switching information table by using the Sid1 as a keyword. When the bFS in the switching information entry is the first transmission switching value, the hardware protection switching entry whose index is EgrID in the switching information entry is found in the local hardware protection switching table, and the Failover value in the found hardware protection switching entry is updated to the Failover value in the switching information entry. When the bRX in the switching information entry is the first reception switching value, the hardware reception entry whose index is IngID in the switching information entry is found in the local hardware reception table, and the Drop identifier in the found hardware reception entry is updated to a reception value. Then, the bFS is updated to the second transmission switching value. The session status in the basic information entry matching the Sid1 is updated to DOWN. Then, the block 405 is executed.

The block 403 is executed on the premise that it is determined in the above block 402 that the attribute identifier of the PW is a value indicating the primary PW. On this premise, Sid1 described above indicates the identifier of the BFD session corresponding to the primary PW. Based on this, at block 403, a matching switching information entry may be determined from the local switching information table by using the Sid1 as a keyword.

For the structure of the switching information entry described above, the EgrID in the switching information entry is specifically an index of the hardware protection switching entry associated with the primary PW. Therefore, based on the EgrID in the switching information entry, the hardware protection switching entry associated with the primary PW may be found. Similarly, the IngID in the switching information entry is specifically an index of the hardware reception entry associated with the backup PW of the primary PW. Therefore, based on the IngID in the switching information entry, the hardware reception entry of the backup PW may be found.

As an example, when the bFS in the switching information entry is the second transmission switching value described above or when the bRX in the switching information entry is the second reception switching value described above, the existing primary/backup PW switching flow is executed, which will not be described.

At block 404, by using a peer session identifier (P-Sid) in the basic information entry matching the Sid1 as a keyword, a matching switching information entry may be determined from the local switching information table. The bFS in the matched switching information entry is then updated to the second transmission switching value and the session status in the basic information entry matching the Sid1 is updated to Down. Then, the block 405 is executed.

This block 404 is executed on the premise that it is determined in the above block 402 that the attribute identifier of the primary/backup PW is a value indicating the backup PW. On this premise, it means that the Sid1 described above indicates the identifier of the BFD session of the backup PW. Based on this, at block 404, with the peer session identifier (P-Sid) in the basic information entry matching the Sid1 as a keyword, a matching switching information entry may be determined from the local switching information table. The switching information entry matching the primary PW is finally found.

At block 405, it is determined whether the Delay identifier in the basic information entry matching the Sid1 is the first Delay value or the second Delay value. If the Delay identifier is the first Delay value, the Down event of the primary PW is reported after the set delayed reporting time T has elapsed. If the Delay identifier is the second Delay value, the Down event of the primary PW is reported.

As described above, the first Delay value indicates the delayed reporting is supported, and the second Delay value indicates the delayed reporting is not supported.

In an example of the present disclosure, a timer table is further involved. The timer table contains a timer event entry. In the present disclosure, the timer event entry is associated with a BFD session, including at least:

Valid: an entry validity identifier. When the Valid is a valid value such as 1, the entry is valid. On the contrary, when the Valid is an invalid value such as 0, the entry is invalid and the initial value of the Valid is a valid value;

Sid: an identifier of a BFD session associated with the timer event entry;

Type: an identifier of a type. Specifically, when the Type is a first identifier value such as 1, it indicates that the switching information entry is updated due to the change of the BFD session into the UP status. When the Type is a second identifier value such as 2, it indicates that the switching information entry is updated due to the change of the PW parameter. When the Type is a third identifier value such as 3, it indicates delayed reporting. The change of the PW parameter will be described hereinafter.

Timer: a timer value of a timer event entry. When the Type is the first identifier value, the Timer is UPDelayTimer in the above feature table. When the Type is the second identifier value, the Timer is the PWUpdateTimer in the above feature table. When the Type is the third identifier value, the Timer is BFDDownTimer in the above feature table.

In the present disclosure, different timer event entries in the timer event table are traversed periodically. For the traversed timer event entry whose Valid is a valid value, a set value, for example, 1 ms, is subtracted from Timer of the timer event entry. When Timer of the timer event entry is reduced to a threshold, such as 0, it means that the timer event entry expires, and at the same time the Valid of the timer event entry is set as an invalid value.

Based on the structure of the timer event entry described above, at block 405, the Down event of the primary PW is reported after the set delayed reporting time T has elapsed, which specifically includes the block O1 and the block O2.

At block O1, a timer event entry (denoted as a timer event entry 1) associated with the Sid1 is set in a local timer event table.

Here, Valid in the timer event entry 1 is a valid value, Sid is the Sid1, Type is the third identifier value, and Timer is BFDDownTimer in the above feature table.

At block O2, when the timer event entry 1 expires, the firmware event is reported to the BFD driving module 211.

When Timer of the timer event entry 1 is reduced to the above threshold, such as 0, it means that the timer event entry 1 expires. The flow executed after the Firmware event is reported to the BFD driving module 211 is similar to the existing primary/backup PW switching flow, which will not be described.

At block 406, when the attribute identifier of the primary/backup PW in the basic information entry matching the Sid1 is a value indicating the primary PW, a matching switching information entry may be determined from the local switching information table by using the Sid1 as a keyword. When the attribute identifier of the primary/backup PW in the basic information entry matching the Sid1 is a value indicating the backup PW, with the P-Sid in the basic information entry matching the Sid1 as a keyword, a matching switching information entry may be determined from the local switching information table. The bFS in the found switching information entry is updated to the second transmission switching value and the session status in the basic information entry matching the Sid1 is updated to Down. The Firmware event is then reported to the BFD driving module 211.

The flow executed by the BFD driving module 211 after receiving a Firmware event is similar to the existing primary/backup PW switching flow, which will not be described.

Thus, the flow shown in FIG. 4 is completed.

As described above, the bFS in the switching information entry is the first transmission switching value, which is the premise for switching from the primary PW to the backup PW. However, when the primary PW cannot be switched to the backup PW, it is needed to update the bFS in the switching information entry to the second transmission switching value timely to avoid erroneous switching from the primary PW to the backup PW. At block 403, block 404, and block 406, updating the bFS to the second transmission switching value is intended to avoid erroneous switching from the primary PW to the backup PW.

FIG. 5 illustrates a flow chart of an example based on the present disclosure. As shown in FIG. 5, the flow may include the following blocks.

At block 501, when the event type is an UP Event, the session status in the basic information entry matching the Sid1 is updated to UP.

This block 501 is executed when it is determined at block 304 that the session status in the basic information entry matching the Sid1 described above is Down.

When the event type is an UP Event, it means that the BFD session corresponding to the Sid1 is changed into an UP status. Therefore, the session status in the basic information entry matching the Sid1 is updated to UP.

In the present example, when the event type is an event type other than the UP Event, the Firmware event is directly reported to the BFD driving module 211, and then executed by the BFD driving module 211 based on the existing primary/backup PW switching flow, which will not be described.

In an example, the block 501 further includes: directly reporting the Firmware event to the BFD driving module 211, and executing the process by the BFD driving module 211 based on the existing primary/backup PW switching flow, which will not be described.

At block 502, the switching information entry is updated after a set first entry updating time has elapsed.

Referring to the above description that the timer event entry expires, correspondingly, the block 502 specifically includes the following blocks.

At block a1, the timer event entry (denoted as timer event entry 2) associated with the Sid1 is set in the local timer event table.

Based on the structure of the timer event entry described above, Valid of the timer event entry 2 is a valid value, Sid is the Sid1, Type is the first identifier value, Timer is the UPDelayTimer in the local feature table, and the first entry updating time at block a1 is the first entry timer value indicated by UPDelayTimer, such as 1000 ms.

At block a2, when the timer event entry 2 expires, the switching information entry is updated.

When Timer of the timer event entry 2 is reduced to the above threshold such as 0, it means that the timer event entry 2 expires.

Figure 6:
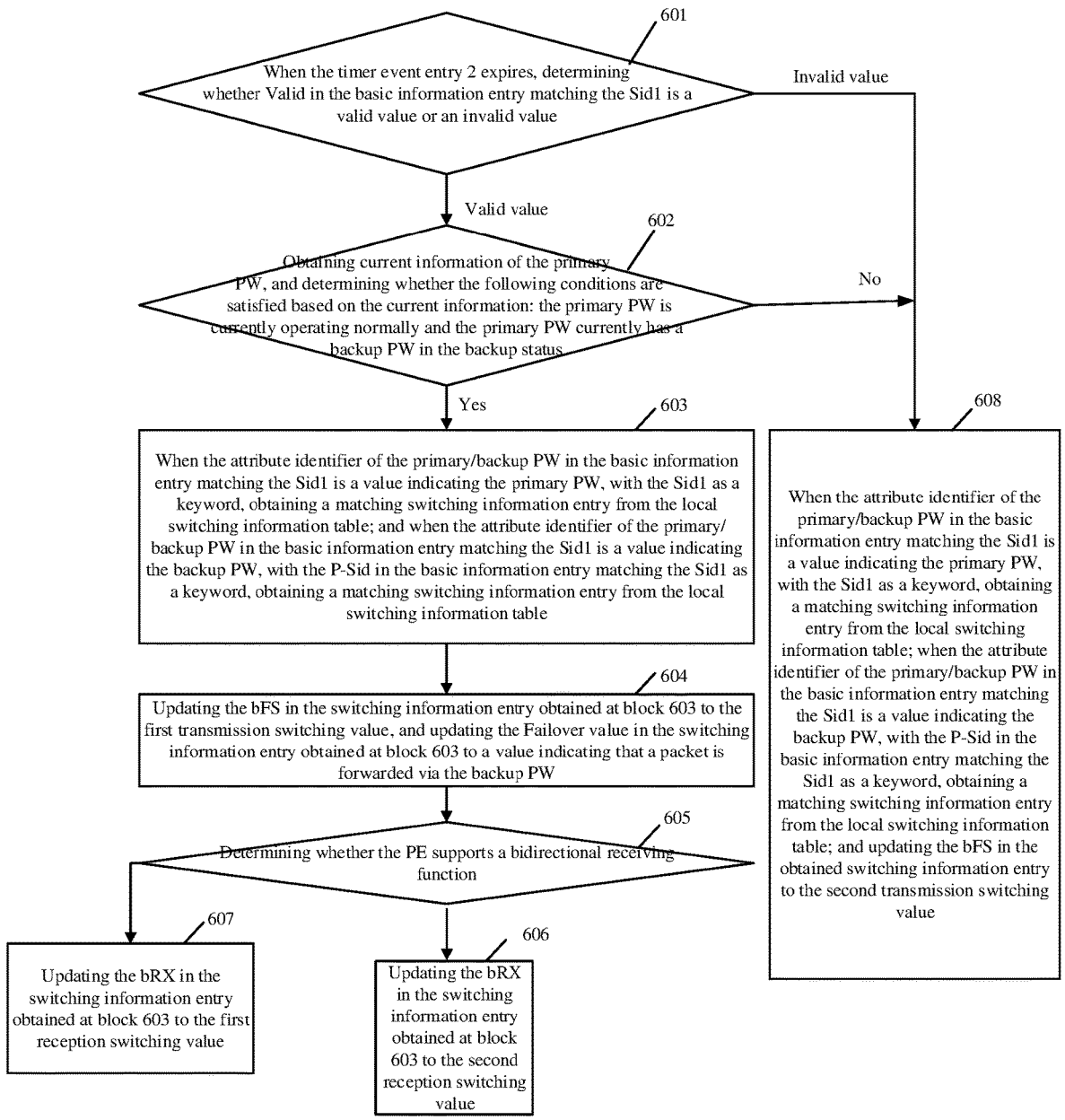
FIG. 6 illustrates a flow chart of switching of a primary/backup PW based on an example of the present disclosure.

How to update the switching information entry when the timer event entry 2 expires may be referred to the flow shown in FIG. 6.

FIG. 6 illustrates a flow chart of an example based on the present disclosure. As shown in FIG. 6, the flow may include the following blocks.

At block 601, when the timer event entry 2 expires, it is determined whether Valid in the basic information entry matching the Sid1 is a valid value or an invalid value. When the Valid is a valid value, the block 602 is executed, and when the Valid is an invalid value, the block 608 is executed.

At block 602, current information of the primary PW is obtained, and it is determined based on the current information whether the following conditions are satisfied: the primary PW is currently operating normally and the primary PW currently has a backup PW in the backup status. If the conditions are satisfied, the block 803 is executed, and if not, the block 808 is executed.

When the Sid1 indicates the BFD session corresponding to the primary PW, the current information of the primary PW corresponding to the Sid1 is obtained.

When the Sid1 indicates the BFD session corresponding to the backup PW, current information of the primary PW corresponding to the P-Sid in the basic information entry with the Sid as the Sid1 is obtained.

Although the information of the primary/backup PW will be recorded in the basic information entry matching the Sid1, the recorded information of the primary/backup PW may be changed since the basic information entry is established at the time of creating the BFD session corresponding to the Sid1. Therefore, the current information of the primary PW will be re-obtained in the block 602. Based on the internal structure of switching the primary/backup PW shown in FIG. 2, the current information of the primary PW may be obtained from the switching platform driving module 212 here. The current information includes at least: whether the primary PW is operating normally, an index of a hardware protection switching entry currently associated with the primary PW, whether the primary PW currently has a backup PW in the backup status, an index of a hardware reception entry associated with the backup PW, an Ingress label of the backup PW, etc.

At block 603, when the attribute identifier of the primary/backup PW in the basic information entry matching the Sid1 is a value indicating the primary PW, with the Sid1 as a keyword, a matching switching information entry may be determined from the local switching information table. When the attribute identifier of the primary/backup PW in the basic information entry matching the Sid1 has a value indicating the backup PW, with the P-Sid in the basic information entry matching the Sid1 as a keyword, a matching switching information entry may be determined from the local switching information table.

At block 604, the bFS in the switching information entry found at block 603 is updated to the first transmission switching value, and the Failover value in the switching information entry found at block 603 is updated to a value indicating that a packet is forwarded via the backup PW. Then, the block 605 is executed.

At block 604, when the bFS in the switching information entry found at block 603 is updated to the first transmission switching value, it means that the primary/backup PW may be switched when the primary PW fails subsequently.

It is to be noted that the EgrID in the switching information entry found at block 603 may be different from the index of the hardware protection switching entry included in the above-obtained current information of the primary PW.

When they are different, at block 604, the EgrID in the switching information entry found at block 603 may be further updated to the index of the hardware protection switching entry included in the above-obtained current information of the primary PW.

At block 605, it is determined whether a PE supports a bidirectional receiving function. If yes, the block 606 is executed, and if no, the block 607 is executed.

The bidirectional receiving function here refers to the function of receiving a packet by the PE via the primary PW and the backup PW at the same time, which may be pre-configured on the PE based on the actual requirements.

At block 606, the bRX in the switching information entry found at block 603 is updated to the second reception switching value. The current flow is ended.

The block 606 is executed on the premise that the PE supports the bidirectional receiving function. Since the PE itself supports the bidirectional receiving function, the primary PW and the backup PW will be certainly started at the same time to receive a packet. Therefore, it is not necessary to perform the reception switching. Therefore, at block 606, the bRX in the switching information entry found at block 603 is directly updated to the second reception switching value indicating that the reception switching is not supported.

At block 607, the bRX in the switching information entry found at block 603 is updated to the first reception switching value.

The block 607 is executed on the premise that the PE does not support the bidirectional receiving function. Since the PE does not support the bidirectional receiving function, the backup PW will certainly not be brought up to receive a packet. When the primary PW is switched to the backup PW, a packet loss will be caused due to the fact that the backup PW does not receive the packet. For this case, it is necessary to bring up the backup PW to receive the packet to avoid the packet loss after the primary PW is switched to the backup PW. Therefore, at block 607, the bRX in the switching information entry found at block 603 is updated to the first reception switching value indicating that the reception switching is supported.

It is to be noted that the IngID in the switching information entry found at block 603 may be different from the index of the hardware reception entry included in the above-obtained current information of the primary PW. When they are different, at block 607, the IngID in the switching information entry found at block 603 may be further updated to the index of the hardware reception entry included in the above-obtained current information of the primary PW. Similarly, when BInLabe in the switching information entry found at block 603 is different from an Ingress label included in the above-obtained current information of the primary PW, at block 607, the BInLabe in the switching information entry found at block 603 may be further updated to the Ingress label included in the above-obtained current information of the primary PW.

At block 608, when the attribute identifier of the primary/backup PW in the basic information entry matching the Sid1 has a value indicating the primary PW, with the Sid1 as a keyword, a matching switching information entry may be determined from the local switching information table. When the attribute identifier of the primary/backup PW in the basic information entry matching the Sid1 has a value indicating the backup PW, with the P-Sid in the basic information entry matching the Sid1 as a keyword, a matching switching information entry may be determined from the local switching information table; and the bFS in the determined switching information entry is updated to the second transmission switching value. The current flow is ended.

Thus, the flow shown in FIG. 6 is completed.

It is to be noted that, in the present disclosure, when it is learned from the switching platform driving module 212 that the primary PW is deleted, the bFS in the switching information entry matching the BFD session corresponding to the primary PW is directly updated to the second transmission switching value to indicate that switching from the primary PW to the backup PW cannot be achieved to avoid erroneous switching from the primary PW to the backup PW.

In addition, when it is learned from the switching platform driving module 212 that the backup PW is deleted, the basic information entry matching the BFD session corresponding to the backup PW is found locally so as to locally find the matched switching information entry, with P-Sid in the found basic information entry as a keyword. The bFS in the matched switching information entry is then updated to the second transmission switching value to indicate that switching from the primary PW to the backup PW cannot be achieved to avoid erroneous switching from the primary PW to the backup PW. In the present disclosure, when a transmission parameter of the primary PW changes, the transmission parameter includes at least an egress port and an egress label. The timer event entry (denoted as the timer entry 3) associated with the BFD session corresponding to the primary PW is added locally. Based on the structure of the timer event entry described above, Valid in the timer event entry 3 is a valid value, Sid indicates the BFD session corresponding to the primary PW, Type is the second identifier value, and Timer is PWUpdateTimer in the local feature table; the switching information entry matching the BFD session corresponding to the primary PW is updated when the timer event entry 3 expires; the updating process is similar to the process described in FIG. 6, which will not be described here.

When a reception parameter of the backup PW changes, the reception parameter including at least a reception port and an ingress label, the timer event entry 4 associated with the BFD session corresponding to the backup PW is added. Based on the structure of the timer event entry described above, Valid in the timer event entry 4 is a valid value, Sid indicates the BFD session corresponding to the backup PW, Type is the second identifier value, and Timer is PWUpdateTimer in the local feature table. The basic information entry matching the BFD session corresponding to the backup PW is found in the basic information table when the timer event entry 4 expires so as to find the switching information entry with Sid as the P-Sid in the matched basic information entry, in the local switching information table. The found switching information entry is substantially the switching information entry matching the BFD session corresponding to the primary PW. Then the found switching information entry may be updated. The updating process is similar to the process described in FIG. 6, which will not be described.

The method provided by the present disclosure has been described above. A device provided by the present disclosure will be described below.

Figure 7:
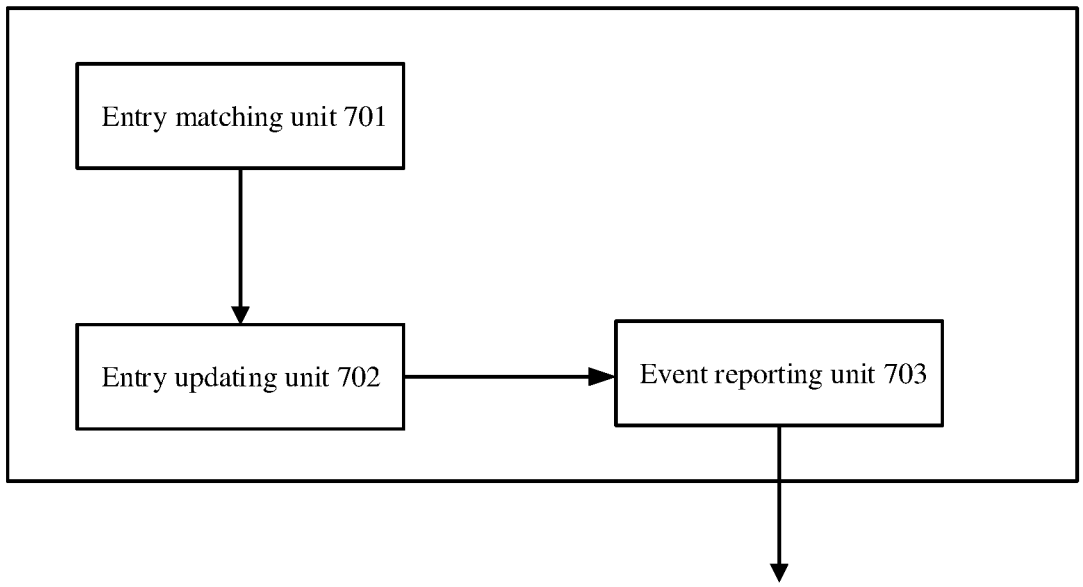
FIG. 7 schematically illustrates a structure diagram of a device based on an example of the present disclosure.

FIG. 7 illustrates a structure diagram of a device based on an example of the present disclosure. The device is applied to a PE, which may be specifically a processing module 213 shown in FIG. 2.

As shown in FIG. 7, the device may include:

an entry matching unit 701 configured to find a switching information entry matching a first BFD session when the first BFD session corresponding to a primary PW detects that the primary PW is changed into a Down status;

an entry updating unit 702 configured to update a Failover value in a hardware protection switching entry associated with a primary PW to a Failover value in the switching information entry when a transmission switching flag (bFS) in the switching information entry has a first transmission switching value indicating that transmission switching is supported, and the Failover value in the switching information entry indicates that a packet is forwarded via a backup PW; and update a drop identifier in a hardware reception entry associated with the backup PW to a reception value indicating that a packet is received when a reception switching flag (bRX) in the switching information entry has a first reception switching value indicating that reception switching is supported and update the bFS to a second transmission switching value indicating that the transmission switching is not supported; and an event reporting unit 703 configured to report a Down event of the primary PW after the entry updating unit 702 has completed entry updating.

As an example, the event reporting unit 703 reports the Down event of the primary PW, specifically including:

finding a first basic information entry matching the first BFD session; reporting the Down event of the primary PW after a set delay time T has elapsed when a Delay parameter of the first basic information entry has a first Delay value indicating that the Down event is supported to be reported with delay, and reporting the Down event of the primary PW when the Delay parameter of the first basic information entry has a second Delay value indicating that the Down event is not supported to be reported with delay.

The entry updating unit 702 further updates the bFS into the second transmission switching value when the primary PW is deleted, or when the first BFD session is deleted.

The entry matching unit 701 further finds a second basic information entry matching a second BFD session corresponding to the backup PW when the backup PW is deleted or the second BFD session corresponding to the backup PW detects that the backup PW is changed into a Down status, where the second basic information entry contains at least a peer session identifier (P-Sid), the P-Sid is the identifier of the peer session of the second BFD session and the peer session of the BFD session is the first PFD session; and finds a switching information entry matching the P-Sid in the second basic information entry.

The entry updating unit 702 is further configured to update the bFS in the matched switching information entry into the second transmission switching value.

The entry updating unit 702 is further configured to add a first timer event entry associated with the first BFD session in a local timer table when a transmission parameter of the primary PW changes where the transmission parameter contains at least an egress port and an egress label; and update the switching information entry when the first timer event entry expires; and add a second timer event entry associated with the first BFD session in the local timer table when the first BFD session is changed into an UP status, where the timer values of the first timer event entry and the second timer event entry are different; and update the switching information entry when the second timer event entry expires.

The entry updating unit 702 updates the switching information entry, including:

determining whether an entry validity identifier of the first basic information entry matching the first BFD session is a valid value indicating that an entry is valid or an invalid value indicating that the entry is invalid;

updating the bFS in the switching information entry into the second transmission switching value if it is an invalid value; and obtaining current information of the primary PW if it is a valid value, where the current information includes at least: whether the primary PW is operating normally and whether the primary PW currently has a backup PW in the backup status; determining whether the following conditions are satisfied based on the current information: the primary PW is currently operating normally and the primary PW currently has a backup PW in the backup status; if the conditions are not satisfied, updating the bFS into the second transmission switching value; and if the conditions are satisfied, updating the bFS into the first transmission switching value and updating the Failover value in the switching information entry into a value indicating that a packet is forwarded via the backup PW, and updating the bRX into the first reception switching value when a PE device does not support a function of receiving the packet by the primary PW and the backup PW at the same time.

The entry updating unit 702 is further configured to add a third timer event entry associated with the second BFD session in a local timer table when a reception parameter of the backup PW changes, where the reception parameter contains at least a reception port and an ingress label; add a fourth timer event entry associated with the second BFD session in the local timer table when the second BFD session is changed into an UP status, where timer values of the third timer event entry and the fourth timer event entry are different; and when the third timer event entry or the fourth timer event entry expires, find a second basic information entry matching the second BFD session, and update the switching information entry matching the P-Sid.

Herein, the second basic information entry contains at least a peer session identifier (P-Sid), where the P-Sid is an identifier of a peer session of the second BFD session, and the peer session of the second BFD session is the first BFD session.

The entry updating unit 702 updates the switching information entry matching the P-Sid, including:

determining whether an entry validity identifier of the second basic information entry is a valid value indicating that an entry is valid or an invalid value indicating that the entry is invalid;

updating the bFS in the switching information entry matching the P-Sid to the second transmission switching value if it is an invalid value; and obtaining current information of the primary PW if it is a valid value, where the current information includes at least: whether the primary PW is operating normally and whether the primary PW currently has a backup PW in the backup status; determining whether the following conditions are satisfied based on the current information: the primary PW is currently operating normally and the primary PW currently has a backup PW in the backup status; if the conditions are not satisfied, updating the bFS in the switching information entry matching the P-Sid to the second transmission switching value; and if the conditions are satisfied, updating the bFS in the switching information entry matching the P-Sid to the first transmission switching value and updating the Failover value in the switching information entry matching the P-Sid to a value indicating that a packet is forwarded via the backup PW, and updating the bRX in the switching information entry matching the P-Sid to the first reception switching value when the PE device does not support the function of receiving the packet by the primary PW and the backup PW at the same time.

Thus, the description of a structure of the device shown in FIG. 7 is completed.

Figure 8:
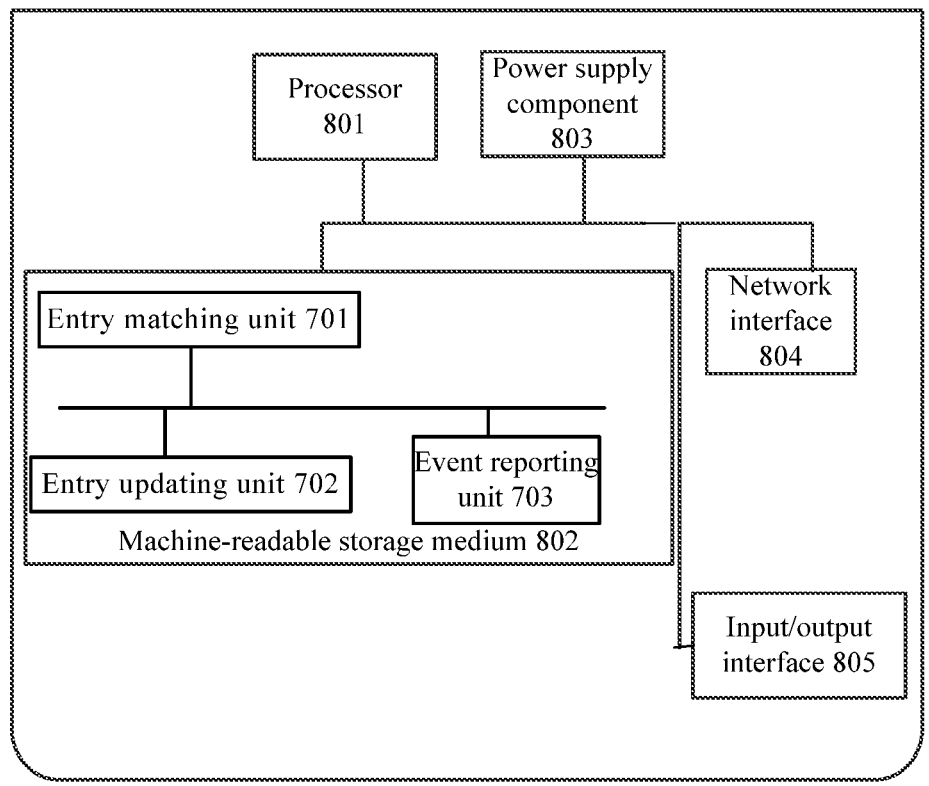
FIG. 8 schematically illustrates a hardware structure diagram of the device shown in FIG. 7 based on an example of the present disclosure.

The present disclosure further provides a hardware structure of the device shown in FIG. 7. FIG. 8 illustrates a schematic diagram of a hardware structure of a device shown in FIG. 7 based on an example of the present disclosure. The device includes a processor 801, and a machine-readable storage medium 802 in which machine-executable instructions are stored. The processor 801 and the machine-readable storage medium 802 may communicate via a system bus. Moreover, the processor 801 may perform the method described above by reading and executing the machine-executable instructions in the machine-readable storage medium 802. As shown in FIG. 8, the hardware structure may further include a power supply component 803 configured to perform power management of the switching device, a wired or wireless network interface 804 configured to connect the device to a network, and an input/output (I/O) interface 805.

The machine-readable storage medium 802 referred to herein may be any electronic, magnetic, optical, or other physical storage devices that may contain or store information such as executable instructions, data, etc. For example, the machine-readable storage medium may be: a Random Access Memory (RAM), a volatile memory, a non-volatile memory, a flash memory, a storage drive (such as a hard disk drive), a solid state hard disk, any type of storage disks (such as discs, dvds, etc.), or a similar storage medium, or a combination thereof.

The machine-readable storage medium 802 is configured to store program instructions run by the entry matching unit 701, program instructions run by the entry updating unit 702, and program instructions run by the event reporting unit 703.

The processor 801 is configured to execute program instructions run by the entry matching unit 701, program instructions run by the entry updating unit 702, and program instructions run by the event reporting unit 703. Herein the processor 801 implements the method as described above by executing the program instructions run by the respective units described above.

Thus, the description of the hardware structure shown in FIG. 8 is completed.

Based on an example of the present disclosure, there is provided a Service Provider Network Edge (PE) device, including:

a processor; and a non-transitory machine-readable storage medium in which machine-executable instructions are stored, wherein by executing the machine-executable instructions, the processor is caused to: find a switching information entry matching a first Bidirectional Forwarding Detection (BFD) session when the first BFD session corresponding to a primary Pseudowire (PW) detects that the primary PW is changed into a Down status;

update a Failover value in a hardware protection switching entry associated with the primary PW to a Failover value in the switching information entry when a transmission switching flag (bFS) in the switching information entry has a first transmission switching value indicating that transmission switching is supported, and the Failover value in the switching information entry indicates that a packet is forwarded via a backup PW;

update a drop identifier in a hardware reception entry associated with the backup PW to a reception value indicating that a packet is received when a reception switching flag (bRX) in the switching information entry has a first reception switching value indicating that reception switching is supported, update the bFS to a second transmission switching value indicating that the transmission switching is not supported; and report a Down event of the primary PW.

Herein, when reporting the Down event of the primary PW, the processor is further caused to:

find a first basic information entry matching the first BFD session;

report the Down event of the primary PW after a set delay time T has elapsed when a Delay parameter of the first basic information entry has a first Delay value indicating that the Down event is supported to be reported with delay, and report the Down event of the primary PW when the Delay parameter of the first basic information entry has a second Delay value indicating that the Down event is not supported to be reported with delay.

The processor is further caused to:
update the bFS into the second transmission switching value when the primary PW is deleted, or when the first BFD session is deleted.

The processor is further caused to:
when the backup PW is deleted or a second BFD session corresponding to the backup PW detects that the backup PW is changed into a Down status, find a second basic information entry matching the second BFD session corresponding to the backup PW, wherein the second basic information entry comprises at least a peer session identifier (P-Sid) indicating a peer session of the second BFD session;

find a switching information entry matching the P-Sid in the second basic information entry; and update the bFS in the matched switching information entry into the second transmission switching value.

The processor is further caused to:
add a first timer event entry associated with the first BFD session in a local timer table when a transmission parameter of the primary PW changes, wherein the transmission parameter comprises at least an outgoing port and an egress label;

add a second timer event entry associated with the first BFD session in the local timer table when the first BFD session is changed into an UP status, wherein timer values of the first timer event entry and the second timer event entry are different; and update the switching information entry when the first timer event entry or the second timer event entry expires.

Herein, when updating the switching information entry, the processor is further caused to:

update the bFS in the switching information entry into the second transmission switching value when an entry validity identifier of the first basic information entry matching the first BFD session indicates that an entry is invalid;

obtain current information of the primary PW when the entry validity identifier indicates that the entry is valid, wherein the current information comprises at least: whether the primary PW is operating normally and whether the primary PW currently has a backup PW in the backup status, determine whether the following conditions are satisfied based on the current information: the primary PW is currently operating normally and the primary PW currently has a backup PW in the backup status, when the conditions are not satisfied,
update the bFS into the second transmission switching value, and when the conditions are satisfied,
update the bFS into the first transmission switching value,
update the Failover value in the switching information entry into a value indicating that a packet is forwarded via the backup PW, and update the bRX into the first reception switching value when the PE device does not support a function of receiving the packet by the primary PW and the backup PW at the same time.

The processor is further caused to:
add a third timer event entry associated with the second BFD session in a local timer table when a reception parameter of the backup PW changes, wherein the reception parameter comprises at least a reception port and an ingress label;

add a fourth timer event entry associated with the second BFD session in the local timer table when the second BFD session is changed into an UP status, wherein timer values of the third timer event entry and the fourth timer event entry are different; and when the third timer event entry or the fourth timer event entry expires, find a second basic information entry matching the second BFD session, wherein the second basic information entry comprises at least a peer session identifier (P-Sid) indicating a peer session of the second BFD session, and update the switching information entry matching the P-Sid.

Herein, when updating the switching information entry matching the P-Sid, the processor is further caused to:

update the bFS in the switching information entry matching the P-Sid into the second transmission switching value when an entry validity identifier of the second basic information entry indicates that an entry is invalid;

obtain current information of the primary PW when the entry validity identifier indicates that the entry is valid, wherein the current information comprises at least: whether the primary PW is operating normally and whether the primary PW currently has a backup PW in the backup status, determine whether the following conditions are satisfied based on the current information: the primary PW is currently operating normally and the primary PW currently has a backup PW in the backup status, when the conditions are not satisfied,
update the bFS in the switching information entry matching the P-Sid into the second transmission switching value, and when the conditions are satisfied,
update the bFS in the switching information entry matching the P-Sid into the first transmission switching value, update the Failover value in the switching information entry matching the P-Sid into a value indicating that a packet is forwarded via the backup PW, and update the bRX in the switching information entry matching the P-Sid into the first reception switching value when the PE device does not support the function of receiving the packet by the primary PW and the backup PW at the same time.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected based on actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided based on the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application based on the idea of the present disclosure. In conclusion, the contents of the present specification shall not be interpreted as limiting to the present disclosure.

The invention claimed is:

1. A method of switching a primary/backup Pseudowire (PW), comprising:
    finding, by a Service Provider Network Edge (PE) device, a switching information entry matching a first Bidirectional Forwarding Detection (BFD) session when the first BFD session corresponding to a primary PW detects that the primary PW is changed into a Down status;
    updating, by the PE device, a Failover value in a hardware protection switching entry associated with the primary PW to a Failover value in the switching information entry when a transmission switching flag (bFS) in the switching information entry has a first transmission switching value indicating that transmission switching is supported, and the Failover value in the switching information entry is a value indicating that a packet is forwarded via a backup PW;
    updating, by the PE device, a drop identifier in a hardware reception entry associated with the backup PW to a reception value indicating that a packet is received when a reception switching flag (bRX) in the switching information entry has a first reception switching value indicating that reception switching is supported, updating, by the PE device, the bFS to a second transmission switching value indicating that the transmission switching is not supported; and reporting, by the PE device, a Down event of the primary PW.

2. The method according to claim 1, wherein reporting the Down event of the primary PW comprises:
    finding, by the PE device, a first basic information entry matching the first BFD session;
    reporting, by the PE device, the Down event of the primary PW after a set delay time T has elapsed when a Delay parameter of the first basic information entry has a first Delay value indicating that the Down event is supported to be reported with delay, and reporting, by the PE device, the Down event of the primary PW when the Delay parameter of the first basic information entry has a second Delay value indicating that the Down event is not supported to be reported with delay.

3. The method according to claim 1, further comprising:
    updating, by the PE device, the bFS into the second transmission switching value when the primary PW is deleted, or when the first BFD session is deleted.

4. The method according to claim 1, further comprising:
    when the backup PW is deleted or a second BFD session corresponding to the backup PW detects that the backup PW is changed into a Down status,
    finding, by the PE device, a second basic information entry matching the second BFD session corresponding to the backup PW, wherein the second basic information entry comprises at least a peer session identifier (P-Sid) indicating a peer session of the second BFD session;
    finding, by the PE device, a switching information entry matching the P-Sid in the second basic information entry; and updating, by the PE device, the bFS in the matched switching information entry into the second transmission switching value.

5. The method according to claim 1, further comprising:
    adding, by the PE device, a first timer event entry associated with the first BFD session in a local timer table when a transmission parameter of the primary PW changes, wherein the transmission parameter comprises at least an egress port and an egress label;
    adding, by the PE device, a second timer event entry associated with the first BFD session in the local timer table when the first BFD session is changed into an UP status, wherein timer values of the first timer event entry and the second timer event entry are different; and updating, by the PE device, the switching information entry when the first timer event entry or the second timer event entry expires.

6. The method according to claim 5, wherein updating the switching information entry comprises:
    updating, by the PE device, the bFS in the switching information entry into the second transmission switching value when an entry validity identifier of the first basic information entry matching the first BFD session indicates that an entry is invalid;
    obtaining, by the PE device, current information of the primary PW when the entry validity identifier indicates that the entry is valid, wherein the current information comprises at least: whether the primary PW is operating normally and whether the primary PW currently has a backup PW in a backup status, determining, by the PE device, whether the following conditions are satisfied based on the current information: the primary PW is currently operating normally and the primary PW currently has a backup PW in the backup status, when the conditions are not satisfied, updating, by the PE device, the bFS into the second transmission switching value, when the conditions are satisfied, updating, by the PE device, the bFS into the first transmission switching value;
    updating, by the PE device, the Failover value in the switching information entry into a value indicating that the packet is forwarded via the backup PW, and updating, by the PE device, the bRX into the first reception switching value when the PE device does not support a function of receiving the packet by the primary PW and the backup PW at the same time.

7. The method according to claim 1, further comprising:
adding, by the PE device, a third timer event entry associated with the second BFD session in a local timer table when a reception parameter of the backup PW changes, wherein the reception parameter comprises at least a reception port and an ingress label;
adding, by the PE device, a fourth timer event entry associated with the second BFD session in the local timer table when the second BFD session is changed into an UP status, wherein timer values of the third timer event entry and the fourth timer event entry are different; and when the third timer event entry or the fourth timer event entry expires;
finding, by the PE device, a second basic information entry matching the second BFD session, wherein the second basic information entry comprises at least a peer session identifier (P-Sid) indicating a peer session of the second BFD session, and updating, by the PE device, the switching information entry matching the P-Sid.

8. The method according to claim 7, wherein updating the switching information entry matching the P-Sid comprises:
updating, by the PE device, the bFS in the switching information entry matching the P-Sid into the second transmission switching value when an entry validity identifier of the second basic information entry indicates that an entry is invalid;
obtaining, by the PE device, current information of the primary PW when the entry validity identifier indicates that the entry is valid, wherein the current information comprises at least: whether the primary PW is operating normally and whether the primary PW currently has a backup PW in the backup status, determining, by the PE device, whether the following conditions are satisfied based on the current information: the primary PW is currently operating normally and the primary PW currently has a backup PW in the backup status, when the conditions are not satisfied, updating, by the PE device, the bFS in the switching information entry matching the P-Sid into the second transmission switching value, when the conditions are satisfied, updating, by the PE device, the bFS in the switching information entry matching the P-Sid into the first transmission switching value;
updating, by the PE device, the Failover value in the switching information entry matching the P-Sid into a value indicating that the packet is forwarded via the backup PW, and updating, by the PE device, the bRX in the switching information entry matching the P-Sid into the first reception switching value when the PE device does not support the function of receiving the packet by the primary PW and the backup PW at the same time.

9. A Service Provider Network Edge (PE) device comprising:
a processor; and a non-transitory machine-readable storage medium in which machine-executable instructions are stored, wherein by executing the machine-executable instructions, the processor is caused to:
find a switching information entry matching a first Bidirectional Forwarding Detection (BFD) session when the first BFD session corresponding to a primary Pseudowire (PW) detects that the primary PW is changed into a Down status;
update a Failover value in a hardware protection switching entry associated with the primary PW to a Failover value in the switching information entry when a transmission switching flag (bFS) in the switching information entry has a first transmission switching value indicating that transmission switching is supported, and the Failover value in the switching information entry indicates that a packet is forwarded via a backup PW;
update a drop identifier in a hardware reception entry associated with the backup PW to a reception value indicating that a packet is received when a reception switching flag (bRX) in the switching information entry has a first reception switching value indicating that reception switching is supported, update the bFS to a second transmission switching value indicating that the transmission switching is not supported; and report a Down event of the primary PW.

10. The device according to claim 9, wherein when reporting the Down event of the primary PW, the processor is further caused to:
find a first basic information entry matching the first BFD session;
report the Down event of the primary PW after a set delay time T has elapsed when a Delay parameter of the first basic information entry has a first Delay value indicating that the Down event is supported to be reported with delay, and report the Down event of the primary PW when the Delay parameter of the first basic information entry has a second Delay value indicating that the Down event is not supported to be reported with delay.

11. The device according to claim 9, wherein the processor is further caused to:
update the bFS into the second transmission switching value when the primary PW is deleted, or when the first BFD session is deleted.

12. The device according to claim 9, wherein the processor is further caused to:
when the backup PW is deleted or a second BFD session corresponding to the backup PW detects that the backup PW is changed into a Down status,
find a second basic information entry matching the second BFD session corresponding to the backup PW, wherein the second basic information entry comprises at least a peer session identifier (P-Sid) indicating a peer session of the second BFD session;
find a switching information entry matching the P-Sid in the second basic information entry; and
update the bFS in the matched switching information entry into the second transmission switching value.

13. The device according to claim 9, wherein the processor is further caused to:
add a first timer event entry associated with the first BFD session in a local timer table when a transmission parameter of the primary PW changes, wherein the transmission parameter comprises at least an outgoing port and an egress label;
add a second timer event entry associated with the first BFD session in the local timer table when the first BFD session is changed into an UP status, wherein timer values of the first timer event entry and the second timer event entry are different; and update the switching information entry when the first timer event entry or the second timer event entry expires.

14. The device according to claim 13, wherein when updating the switching information entry, the processor is further caused to:
update the bFS in the switching information entry into the second transmission switching value when an entry validity identifier of the first basic information entry matching the first BFD session indicates that an entry is invalid;

obtain current information of the primary PW when the entry validity identifier indicates that the entry is valid, wherein the current information comprises at least: whether the primary PW is operating normally and whether the primary PW currently has a backup PW in the backup status, determine whether the following conditions are satisfied based on the current information: the primary PW is currently operating normally and the primary PW currently has a backup PW in the backup status, when the conditions are not satisfied, update the bFS into the second transmission switching value, and when the conditions are satisfied, update the bFS into the first transmission switching value, update the Failover value in the switching information entry into a value indicating that a packet is forwarded via the backup PW, and update the bRX into the first reception switching value when the PE device does not support a function of receiving the packet by the primary PW and the backup PW at the same time.

15. The device according to claim 9, wherein the processor is further caused to:

add a third timer event entry associated with the second BFD session in a local timer table when a reception parameter of the backup PW changes, wherein the reception parameter comprises at least a reception port and an ingress label;

add a fourth timer event entry associated with the second BFD session in the local timer table when the second BFD session is changed into an UP status, wherein timer values of the third timer event entry and the fourth timer event entry are different; and when the third timer event entry or the fourth timer event entry expires, find a second basic information entry matching the second BFD session, wherein the second basic information entry comprises at least a peer session identifier (P-Sid) indicating a peer session of the second BFD session, and update the switching information entry matching the P-Sid.

16. The device according to claim 15, wherein when updating the switching information entry matching the P-Sid, the processor is further caused to:

update the bFS in the switching information entry matching the P-Sid into the second transmission switching value when an entry validity identifier of the second basic information entry indicates that an entry is invalid;

obtain current information of the primary PW when the entry validity identifier indicates that the entry is valid, wherein the current information comprises at least: whether the primary PW is operating normally and whether the primary PW currently has a backup PW in the backup status, determine whether the following conditions are satisfied based on the current information: the primary PW is currently operating normally and the primary PW currently has a backup PW in the backup status, when the conditions are not satisfied, update the bFS in the switching information entry matching the P-Sid into the second transmission switching value, and when the conditions are satisfied, update the bFS in the switching information entry matching the P-Sid into the first transmission switching value, update the Failover value in the switching information entry matching the P-Sid into a value indicating that a packet is forwarded via the backup PW, and update the bRX in the switching information entry matching the P-Sid into the first reception switching value when the PE device does not support the function of receiving the packet by the primary PW and the backup PW at the same time.

* * * * *